US009307702B1

(12) United States Patent
Lauer

(10) Patent No.: US 9,307,702 B1
(45) Date of Patent: Apr. 12, 2016

(54) PLANTING POTS WITH WIRE MESH AND BIODEGRADABLE MATERIAL

(76) Inventor: Mark Lauer, Pleasanton, CA (US)

( * ) Notice: Subject to any disclaimer, the term of this patent is extended or adjusted under 35 U.S.C. 154(b) by 929 days.

(21) Appl. No.: 12/901,427

(22) Filed: Oct. 8, 2010

Related U.S. Application Data

(60) Provisional application No. 61/250,181, filed on Oct. 9, 2009.

(51) Int. Cl.
*A01G 9/02* (2006.01)
*A01G 9/10* (2006.01)
*A01G 23/04* (2006.01)

(52) U.S. Cl.
CPC *A01G 9/102* (2013.01); *A01G 9/10* (2013.01); *A01G 23/04* (2013.01)

(58) Field of Classification Search
CPC ....... A01G 9/102; A01G 9/021; A01G 23/04; A01G 13/0268; A01G 13/02; A01G 13/10; A01G 9/02; A01G 23/046
USPC ............. 47/74, 78, 31, 65.7, 65.5, 73, 75, 76, 47/77, 32, 29.7
See application file for complete search history.

(56) References Cited

U.S. PATENT DOCUMENTS

| | | | | |
|---|---|---|---|---|
| 4,807,393 A | * | 2/1989 | Bracken | 47/76 |
| 5,018,300 A | | 5/1991 | Chiu et al. | |
| 5,171,390 A | * | 12/1992 | Travers | 156/212 |
| 5,311,700 A | * | 5/1994 | Thomas | 47/76 |
| 5,495,692 A | | 3/1996 | LoJacono, Jr. | |
| 5,605,012 A | * | 2/1997 | Weder et al. | 47/64 |
| 5,759,225 A | * | 6/1998 | Tanoshima | 71/24 |
| 6,092,331 A | | 7/2000 | Stoever | |
| 6,202,348 B1 | * | 3/2001 | Reiger | 47/78 |
| 6,612,072 B2 | * | 9/2003 | Busby et al. | 47/65.8 |
| 8,033,048 B2 | * | 10/2011 | Whitcomb | 47/32.7 |
| 8,261,488 B2 | * | 9/2012 | Kempf | A01G 9/10 47/78 |
| 2004/0025435 A1 | * | 2/2004 | Stoever | 47/74 |
| 2004/0111967 A1 | * | 6/2004 | Raap et al. | 47/74 |

FOREIGN PATENT DOCUMENTS

DE 10009716 A1 * 11/2000 ............... A01G 9/02

OTHER PUBLICATIONS

Jiffy—Historical Background by Jiffy Products. Downloaded from http:/www.jiffygroup.com/jiffy/history/historical_background. Printed Nov. 7, 2011. 2 pages (2nd pg. blank).

(Continued)

*Primary Examiner* — Shadi Baniani
(74) *Attorney, Agent, or Firm* — Mark Lauer; Silicon Edge Law Group LLP

(57) ABSTRACT

A container for a plant includes a wire mesh that is formed in the shape of a plant pot, and a layer of biodegradable material that is attached to the wire mesh in the shape of the pot. The container provides protection to plant roots from gophers and protection from root damage during transplanting, and can reduce air gaps between a pot and a hole in the ground, saving plants from drying out. The wire mesh provides a supportive frame so that the biodegradable material layer can be thinner, with the biodegradable material quickly softening and/or decomposing to let the plant roots grow through the pot into the soil. The wire mesh can extend beyond the biodegradable material layer at a top of the pot to provide protection against surface foraging rodents.

20 Claims, 3 Drawing Sheets

(56) References Cited

OTHER PUBLICATIONS

Jiffy—History by Jiffy Products. Downloaded from http://www.jiffygroup.com/jiffy/history.html. Printed Nov. 7, 2011. 2 pages (2nd pg. blank).

Jiffypot—Jiffy Let's grow together. Downloaded from their website at www.jiffygroup.com on Nov. 7, 2011. 1 page.

Grassel, Milt. "Jackpot from Paper Pots." Downloaded from http://weternpulp.com/about-history.html. Printed Jul. 9, 2010. 3 pages.

"Digger's Gopher Wire Basket—Root Guard—Gopher Wire Roll . . . " Downloaded from http://gopherbasket.com/. Printed on Nov. 7, 2011. 1 page.

"Digger's Gopher Wire Basket, Root Guard Gopher Cages, S . . . " Downloaded from http://gopherbasket.com/gopher_wire_basket.html. Printed on Nov. 7, 2011. 1 page.

* cited by examiner

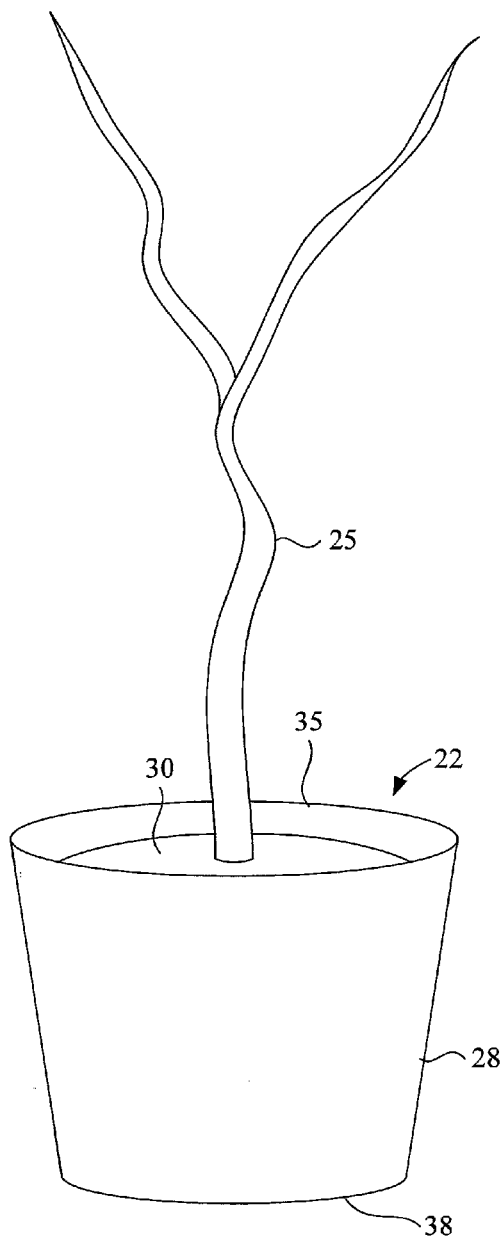
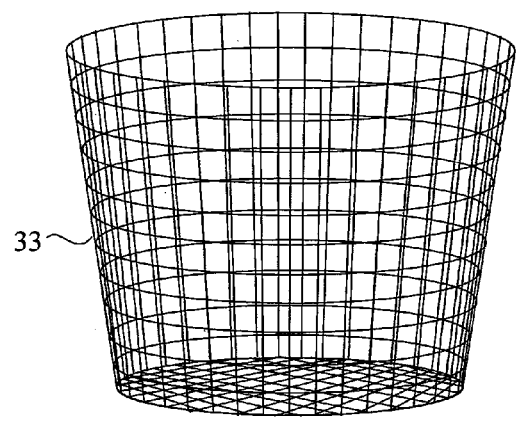
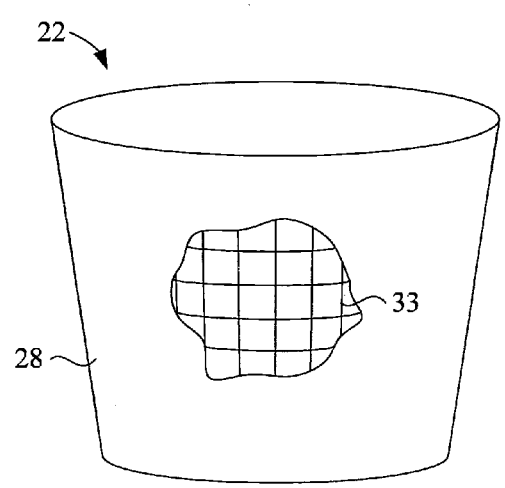
FIG. 2
FIG. 3
FIG. 1

PLANTING POTS WITH WIRE MESH AND BIODEGRADABLE MATERIAL

CROSS REFERENCE TO RELATED APPLICATIONS

This application claims priority to Provisional Application 61/250,181, filed Oct. 9, 2009, by the same inventor and having the same title, which is incorporated by reference herein.

BACKGROUND AND SUMMARY

Gophers and other rodents have presented problems for agriculture for millennia, and U.S. patents directed to solving problems related to gophers can be found that date back at least one hundred years. Simply put, there is a longstanding need for preventing gopher damage to plants, as further evidenced by multiple current research papers and products, none of which offer very effective or convenient solutions. Ironically, increased use of drip irrigation and other agricultural improvements may actually worsen such rodent problems, as the rodents are attracted by the water to the exact location of a plant's roots.

Proposed solutions include metal and plastic barriers, natural predators including owls, cats and snakes, and olfactory repulsions such as castor oil or predator urine. It is known for example to use wire mesh as a gopher barrier, and it is possible to create a wire mesh barrier that is placed into a hole in the ground prior to planting a plant in the hole. One item that can be purchased from some retail nurseries and at www.gopherbasket.com is a rectangular length of chicken-wire that has been folded in half and then crimped with a bar along its edges adjoining the fold, assuming the shape of an envelope which can then be opened at the edges furthest from the fold to form a strangely shaped wire mesh barrier that can be placed in a hole in the ground. It is alleged that the bar and fold can be bent and somehow formed into a round bottom, but the present inventor could not accomplish this, although it may be possible for someone else to bend the bar and wire into such a round shape with appropriate tools.

In the last half-century, biodegradable plant pots have become available. For example, Jiffy® Pots have been available since 1959, according to the website: http://www.jiffypot.com/. Biodegradable plant pots have advantages including the ability to transplant plants grown in the containers into the ground without disturbing the plants' roots. Another advantage of the biodegradable plant pots is that they generally serve to replace plastic pots that are formed from scarce resources (oil and energy), that are typically not recycled, and that last essentially forever. Some pots, such as Jiffy® Pots, are made from peat, which is itself a limited resource. Other commercially available biodegradable pots may be formed from recycled cardboard, ground plant fibers or the like that may be mixed with binding agents, placed in a mold and heated. Typically, pots made of such thick pressed cardboard do not disintegrate to let roots pass through easily for a number of years.

When a plant that had been growing in a plastic or metal container is placed in a hole in the ground that has a wire mesh gopher barrier installed, soil from the container may settle through the holes in the mesh, while the roots can be broken by the mesh. This type of settling is one of the ways that the plant's roots may be damaged during transplanting from such traditional containers. In contrast, when a plant that had been growing in a biodegradable pot is placed in a similar hole, the soil inside the pot is contained and so cannot settle to fill any spaces between the pot and the hole. Unfortunately, this can leave air gaps that can dry out the transplant or otherwise harm the roots, stunting or even killing the plant. Having wire mesh in the hole may exacerbate this problem. For example, when a chicken-wire envelope of the type described above is placed in a hole, in which it typically does not fit, the difference in shape between the pot, the hole and the chicken-wire envelope adds additional spacing between the pot and the hole. Moreover, the wire can make it more difficult for the ground surrounding the hole, which is often harder than the nursery soil in the pot, to disperse through the mesh to fill the spacing between the hole and the pot.

In one embodiment, a container for a plant is disclosed, including a wire mesh that is formed in the shape of a plant pot, and a layer of biodegradable material that is attached to the wire mesh in the shape of the pot. In this case, a single pot can conveniently offer plant roots both protection from gophers and protection from root damage during transplanting, with the biodegradable material quickly softening and/or decomposing to let the plant roots grow through the pot into the soil. Moreover, the problem of the plant drying out and dying after being planted in the ground due to air spaces surrounding the pot is ameliorated.

In one exemplary embodiment, the wire mesh may have holes that are in a range between ½ cm and about 3½ cm, preferably in a range between about ½ inch (1.3 cm) and about 1¼ inch (3.2 cm). The wire mesh can provide a frame for the biodegradable material, which allows the biodegradable material to be weaker or the pot to be larger than may otherwise be possible. For example, it could be difficult to use peat pots that are large enough hold a gallon or more of soil without breaking the pots. However, with an appropriate wire mesh providing a frame having greatly increased tensile strength, such pots could be much less prone to breakage.

Surprisingly, although the mesh may not disintegrate for years, tree, vegetable or other plant roots can grow through the spaces in the mesh and expand to swallow the wires without any noticeable damage to the plants. Certain wires, e.g. those containing iron or other minerals, may even provide beneficial nutrients that are slowly released. The wire of the mesh can be galvanized or otherwise treated to avoid decomposition, or can be made with materials designed to decompose over a certain time period. Once a plant, such as a tree, has reached a certain size, the roots at its base can be large enough to mostly avoid damage or at least death from gophers, which may prefer smaller roots that are tenderer and offer a greater proportion of growing material. Thus a wire mesh that disintegrates in several years may be beneficial for that type of plant.

In one exemplary embodiment, the wire mesh may extend up to several inches beyond the organic material of the pot at the top of the pot. This extension can be used as an above-ground gopher fence when the biodegradable material is buried in the planting hole to terminate approximately at ground level, and can provide a handle for the pot, which can be especially useful in freeing the pot from another pot that it is nested in. In one embodiment, the wire mesh that extends above the biodegradable material can be separated into a few sections, so that the mesh can be more easily folded inward toward the center, covering the roots from above. Alternatively, the biodegradable material can completely cover the wire mesh, including covering any sharp edges of wire that might exist if not manufactured carefully. Other embodiments contemplate having the wire mesh exposed on a surface of the pot, either a surface facing the interior of the pot (where the soil is to go), or an exterior surface (which is visible from outside the pot when the interior is filled with soil).

Integrated wire mesh/organic pots for vegetables or other annuals can be reused in subsequent years by nesting standard sized organic pots containing new vegetables in the recovered mesh pots, or simply planting the annuals in the ground within the mesh pots. Wire mesh pots, whether reused from a previous planting or new, can also be covered on the interior and/or exterior surface with household biodegradable material such as wet newspaper to form an integrated wire mesh/biodegradable pot.

Containers of wire mesh and biodegradable material can be tapered to be generally larger near a top of the container than near a bottom of the container, to better fit the growth of roots from the base of a plant and for aesthetic value, as well as to nest within other such containers. In various exemplary embodiments, such containers can have a circular horizontal cross-section, a substantially square horizontal cross-section or a substantially hexagonal horizontal cross-section. As mentioned above, a plant pot formed from the combination of wire mesh and biodegradable material has a number of synergistic advantages that are not found in any of the prior art of which the inventor is aware.

BRIEF DESCRIPTION OF THE DRAWINGS

FIG. 1 is a perspective view of a plant pot according the present disclosure holding a plant.

FIG. 2 is a perspective view of a wire mesh part of the plant pot of FIG. 1.

FIG. 3 is a perspective view of the plant pot of FIG. 1 with a cutaway view of the wire mesh that is within a biodegradable material layer.

DETAILED DESCRIPTION

Figure 4:
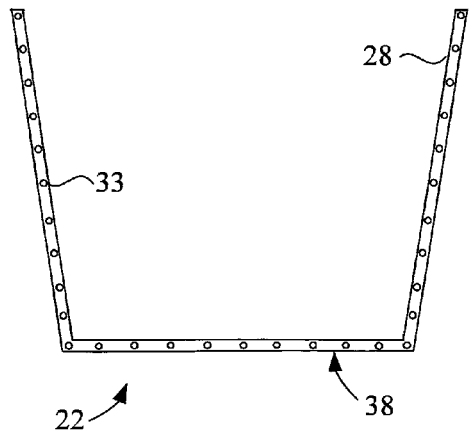
FIG. 4 is a cross-sectional view of the plant pot of FIG. 1 having wire mesh integrated with a biodegradable material layer.

FIG. 1 shows an embodiment of a plant pot 22 according the present disclosure holding a plant 25. The plant 25 may in the illustrated example be a deciduous tree, such as a fruit or nut tree, but in general such a plant may be any kind of tree, vine, vegetable, flowering plant, etc., which can be housed at least temporarily in a planting container. The plant 25 has roots that are buried in soil 30 that is held in the pot 22. Often, such a plant 25 may be transplanted into the ground, preferably while remaining within its pot 22, but this is not necessary. The pot 22 contains a layer of biodegradable material 28 that holds the soil 30 but is designed to degrade when in the ground to allow the plant's roots to penetrate the pot 22. The pot 22 also contains a wire mesh 33, shown in FIG. 2, which is not visible in FIG. 1 because it is covered by the biodegradable material layer 28. The pot 22 is tapered, so that it is larger near a top opening 35 than a bottom surface 38.

FIG. 2 shows the wire mesh 33 that has the shape of the pot 22, and indeed forms part of that pot. In this embodiment, the wire mesh may have spaces between adjacent somewhat parallel wires that are in a range between ½ cm and about 3 cm, preferably in a range between about ¼ inch and 1 inch. The wire mesh 33 can be made of iron or steel that has been galvanized, plastic coated, painted, powder coated or otherwise protected from corrosion, or the wire can be uncoated, depending upon the desired amount of time the wire is designed to last. The gauge of the wire must be sufficient to deter gophers and other rodents from chewing through, which may for example be 18 gauge steel for embodiments having larger spaces, such as 1 inch. Smaller gauge wire may be used for smaller spaced embodiments, such as those with ¼ inch spaces. Similarly, smaller holes can be used for smaller pots, such as those holding two liters or less of soil, which may be employed for instance to grow annual plants or vegetables that may not have as large roots as those of trees that grow in containers holding more than four liters of soil.

The wire mesh 33 can be shaped as a planting pot in various ways. For example, a substantially circular piece of mesh which is to form a bottom of the mesh and pot can be cut out or otherwise fabricated, and attached to a substantially trapezoidal length of mesh that is wound in a somewhat cylindrical, albeit tapered, shape to form the side of the mesh and pot. As another example, a length of mesh can be formed into somewhat cylindrical, albeit tapered, shape that extends beyond a desired bottom of the pot-shaped mesh, with the excess bent to be approximately horizontal to form the bottom of the pot-shaped mesh. In this case, that extension may measure slightly less than half of the diameter of the bottom, leaving a small hole in the center of the bottom for watering, although a centrally located mesh hole can also be used for a drain hole. Also in that case, the extension may be cut into sections, and the sections attached together after bending to form the bottom.

Although the mesh has substantially rectangular or trapezoidal spaces between adjacent wires in this embodiment, other shapes are possible, including substantially hexagonal or triangular shaped holes. Also, although the wire mesh has a circular horizontal cross-section in this embodiment, other embodiments may have substantially square or hexagonal horizontal cross-sections. The wires of the mesh 33 may be fixedly attached to each other at intersections between adjacent wires, for example by weaving or welding. This provides compressive strength that buttresses the structural integrity of the pot 22, and allows the naked mesh 33 to stand upright as shown in FIG. 2, which can facilitate fabrication of the pot.

FIG. 3 shows the plant pot 22 of FIG. 1 with the biodegradable material layer 28 cutaway to show the wire mesh 33 to which it is otherwise attached. The wire mesh 33 in this embodiment provides a frame for the biodegradable material 28, which allows the biodegradable material to be weaker or the pot 22 to be larger than may otherwise be possible. For example, pots with a wire mesh frame can employ pressed cardboard that is less than half as thick as is conventional, allowing the plant roots to penetrate the cardboard much more quickly, without undermining the structural integrity of the pots. Moreover, pots made of peat, which breaks and crumbles easily, can be strengthened by the wire mesh frame so that the pots can be made larger than is conventional.

Similarly, wire mesh frames can provide support for pots that include biodegradable material from plant fibers such as rice, corn, wheat, sugar cane, bamboo, etc. Preferably the biodegradable material 28 is organic and does not include glue or other binding agents. The wire mesh 33 and biodegradable material 28 are integrated together in this embodiment to create a transplantable pot 22 that conveniently provides gopher protection to the plant 25. The structural integrity of the biodegradable material may be reduced when wet, and so it is helpful for some embodiments to keep the pot dry after it has been formed until is planted. Support from the wire mesh 33 frame allows the layer of biodegradable material 28 to be thinner than that which would be self-supporting when wet.

FIG. 4 shows a vertical cross-section view of the plant pot 22 of FIG. 1 having wire mesh 33 integrated with a biodegradable material layer 28. The pot 22 may be a standard nursery pot size and shape, such as "number one" (one gallon), "number two" (two gallons), "number five" (five gallons), etc., as well as smaller standard sizes. The pot 22 has a flat bottom surface 38. The pot may have a lip at the top 35 which is not shown.

Figure 5:
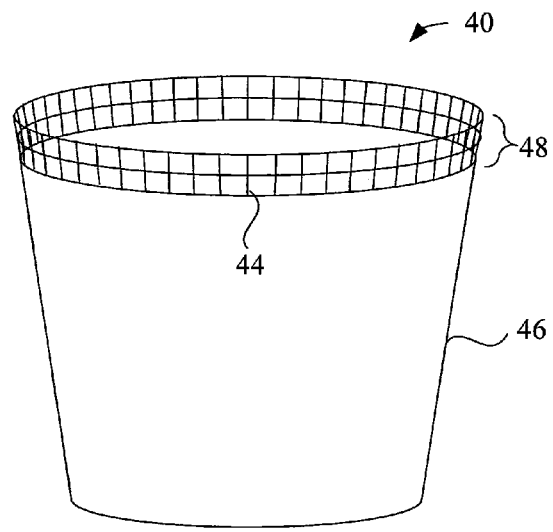
FIG. 5 is a perspective view of a plant pot according the present disclosure with wire mesh extending above a biodegradable material layer.

FIG. 5 shows a plant pot 40 having a wire mesh 44 integrated with a biodegradable material layer 46 along most of the pot, but with the wire mesh 44 extending beyond the biodegradable material layer 46 at a top of the pot. This extension of the wire mesh 44 may be between a few centimeters and ten centimeters in height to provide a fence 48 around the plant when the top of the biodegradable material 28 is located at about ground level, keeping gophers that are foraging on the surface of the ground from harming the plant. Advantageously, for a tapered pot 40 and mesh 44, the fence 48 may tilt outward, making it more difficult for a gopher to scale the fence. In another embodiment that is not shown, such a fence can be divided into two, three, four or more sections that are adapted to fold inward toward a plant after the plant has been planted in the pot. In this case, the extension of the mesh can be about half the diameter of the pot at the top of the biodegradable material layer, so that the sections can be folded to cover the roots of the plant, and if desired can be long enough to cover some of the plant's stem.

Figure 6:
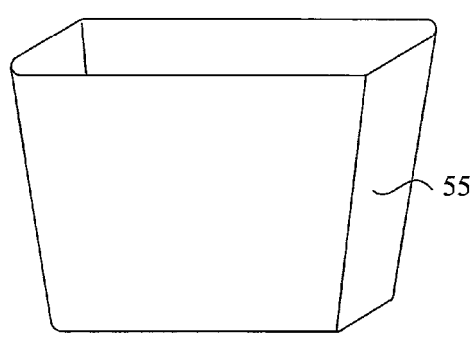
FIG. 6 is a perspective view of a plant pot according the present disclosure with a substantially square horizontal cross-section.

FIG. 6 shows a plant pot 50 with a substantially square horizontal cross-section. Although not shown in this view, the pot contains a wire mesh frame in the shape of the pot 50, which is attached to a biodegradable material layer 55. In an alternative embodiment that is not shown, such a wire mesh can extend above the pot to form a fence for deterring above-ground gophers. Also not shown is an embodiment in which such a wire mesh extends above the pot and is divided into sections, preferably along the four corners of the pot.

Figure 7:
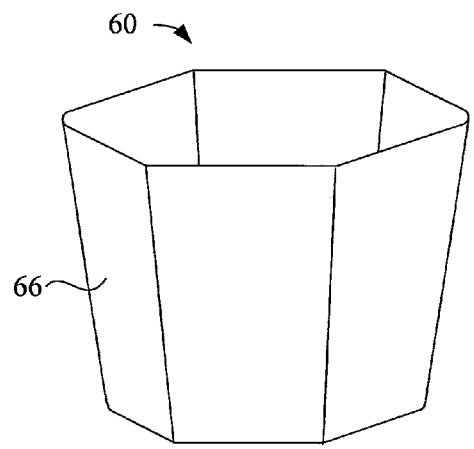
FIG. 7 is a perspective view of a plant pot according the present disclosure with a substantially hexagonal horizontal cross-section.

FIG. 7 shows a plant pot 60 with a substantially hexagonal horizontal cross-section. Although not shown in this view, the pot contains a wire mesh frame in the shape of the pot 60, which is attached to a biodegradable material layer 66. In an alternative embodiment that is not shown, such a wire mesh can extend above the pot to form a fence for deterring above-ground gophers. Also not shown is an embodiment in which such a wire mesh extends above the pot and is divided into sections, preferably at along the six corners of the pot.

Figure 8:
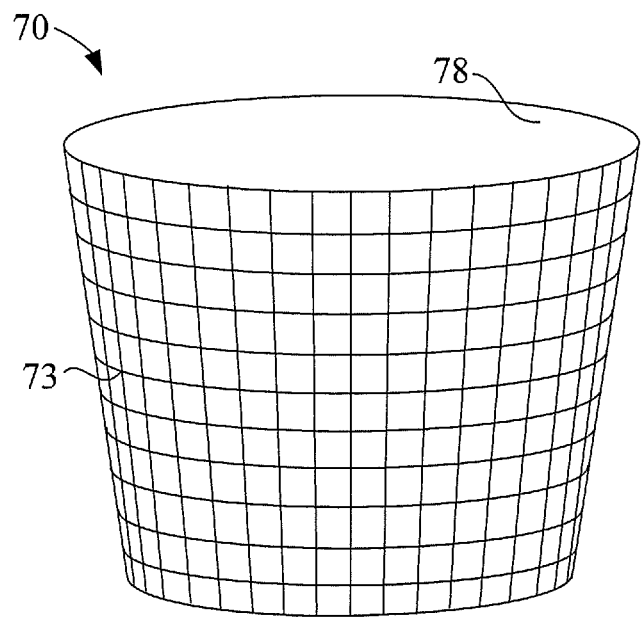
FIG. 8 is a perspective view of a plant pot according to the present disclosure with biodegradable material covering a wire mesh on an interior surface of the pot, and the wire mesh exposed on an exterior surface of the pot.

FIG. 8 shows a plant pot 70 with biodegradable material 78 covering a wire mesh on an interior surface of the pot, and the wire mesh 73 exposed on an exterior surface of the pot.

Figure 9:
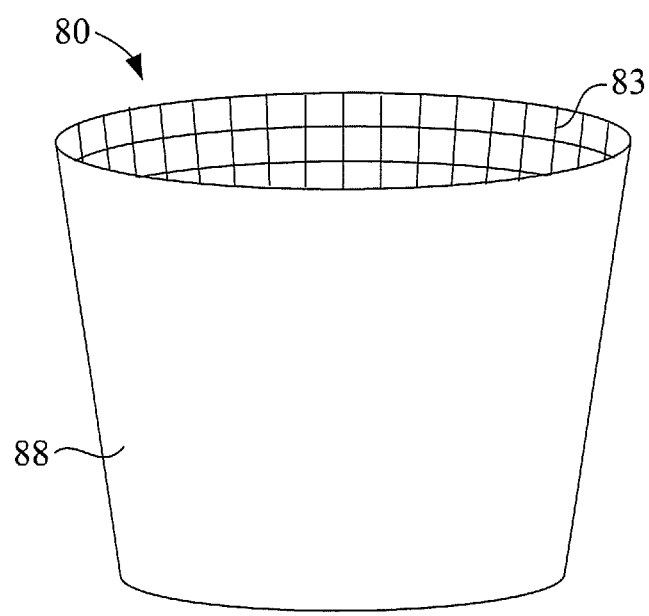
FIG. 9 is a perspective view of a plant pot according to the present disclosure with biodegradable material covering the wire mesh on an exterior surface of the pot, and the wire mesh exposed on an interior surface of the pot.

FIG. 9 shows a plant pot 80 with biodegradable material 88 covering a wire mesh on an exterior surface of the pot, and the wire mesh 83 exposed on an interior surface of the pot.

The foregoing description has been presented for the purposes of illustration and description. It is not intended to be exhaustive or to limit the invention to the precise form disclosed. It is intended that the scope of the invention be limited not by this description including these drawings, but rather by the claims appended hereto. Any advantages and benefits described may not apply to all embodiments of the invention. It is contemplated that the invention will be sold in association with the trademark "Lauer Pots."

The invention claimed is:

1. A device comprising:
   a wire mesh that is configured in the shape of a plant pot, the mesh including a substantially flat bottom and at least one upright side that adjoin each other, the bottom and at least one side forming a container that is tapered such that it is generally larger near a top than near the bottom, with the side terminating at the bottom and the mesh having openings between adjacent wires that are at least 1.3 centimeters and less than three and one-half centimeters;
   a layer of biodegradable material that is attached to the wire mesh in the shape of the pot; and
   soil that is held within the container by the layer of biodegradable material, with a plant that is planted in the soil.

2. The device of claim 1, wherein the wire mesh extends beyond the biodegradable material at the top of the container.

3. The device of claim 1, wherein the biodegradable material substantially covers the wire mesh.

4. The device of claim 1, wherein the biodegradable material covers the wire mesh on an interior surface of the container, and the wire mesh is exposed on an exterior surface of the container, such that the wire mesh can be seen from outside the container.

5. The device of claim 1, wherein the biodegradable material covers the wire mesh on an exterior surface of the container, and the wire mesh is exposed on an interior surface of the container, such that the wire mesh contacts the soil.

6. The device of claim 1, wherein the container has a substantially circular horizontal cross-section.

7. The device of claim 1, wherein the container has a substantially square horizontal cross-section.

8. The device of claim 1, wherein the container has a substantially hexagonal horizontal cross-section.

9. The device of claim 1, wherein the soil is wet, and the layer of biodegradable material has insufficient strength to contain the soil within the container without the wire mesh.

10. The device of claim 1, wherein the openings between adjacent wires are at least two centimeters.

11. A device comprising:
    a self-supporting frame that includes wire mesh that is configured in the shape of a plant pot, the frame including a substantially flat bottom that is joined to at least one upright side that terminates at the bottom, the mesh having openings between adjacent wires that are at least 1.3 centimeters and less than three and one-half centimeters; and
    a layer of biodegradable material that is attached to the frame in the shape of the pot, wherein the frame and the layer of biodegradable material together form a container that is tapered such that it is generally larger near a top than near the bottom, the container adapted to hold soil for a plant, to keep gophers outside the container, and to promote growth of roots of the plant through the container.

12. The device of claim 11, wherein the wire mesh extends beyond the biodegradable material at a top of the container.

13. The device of claim 11, wherein the biodegradable material includes peat.

14. The device of claim 11, wherein the container has a substantially square horizontal cross section.

15. The device of claim 11, wherein the biodegradable material includes plant fibers.

16. A device comprising:
- a frame that includes wire mesh configured in the shape of a plant pot, the frame including a substantially flat bottom that is joined to at least one upright side that terminates at the bottom, the mesh having openings between adjacent wires that are at least 1.3 centimeters and less than three and one-half centimeters; and
- a layer of biodegradable material that is attached to the frame in the shape of the pot, wherein the layer of biodegradable material is integrated with the frame to form a container that is tapered such that it is generally larger near a top than near the bottom, the container adapted to hold soil for a plant, to keep gophers outside the container, to avoid air spaces between the container and ground into which the container is planted and to allow plant roots to grow through the container into the ground.

17. The device of claim 16, wherein the wire mesh extends beyond the biodegradable material at a top of the pot.

18. The device of claim 16, wherein the openings between adjacent wires of the wire mesh are at least two centimeters.

19. The device of claim 16, wherein the wire mesh has wires that are fixedly attached to each other.

20. The device of claim 16, wherein the bottom is substantially rectangular.

\* \* \* \* \*